United States Patent [19]
Livoni

[11] Patent Number: 5,598,008
[45] Date of Patent: Jan. 28, 1997

[54] WAVELENGTH SELECTIVE LIGHT COLLECTOR SYSTEM

[75] Inventor: Linden J. Livoni, Los Gatos, Calif.

[73] Assignee: Lumisys, Inc., Sunnyvale, Calif.

[21] Appl. No.: 544,715

[22] Filed: Oct. 18, 1995

[51] Int. Cl.⁶ .......................... G01T 1/105; G03B 42/02
[52] U.S. Cl. ........................................................ 250/586
[58] Field of Search ........................................... 250/586

[56] References Cited

U.S. PATENT DOCUMENTS

| | | | |
|---|---|---|---|
| 4,680,473 | 7/1987 | Matsuda et al. | 250/586 |
| 4,743,759 | 5/1988 | Boutet | 250/586 |
| 4,864,134 | 9/1989 | Hosoi et al. | 250/586 |
| 5,140,160 | 8/1992 | Boutet et al. | |
| 5,274,228 | 12/1993 | Kaplan | 250/227.31 |
| 5,369,481 | 11/1994 | Berg et al. | 356/319 |
| 5,507,976 | 4/1996 | Bringley et al. | 252/301.4 H |

FOREIGN PATENT DOCUMENTS 6-160311  6/1994  Japan ........................................ 250/586

*Primary Examiner*—Constantine Hannaher
*Attorney, Agent, or Firm*—Thomas Schneck

[57] ABSTRACT

A hollow light collector has an internal surface coated with a wavelength selective coating to absorb light energy within a predefined range of wavelengths and reflect all other light energy. In the preferred embodiment, the light collector is cylindrical in shape and includes an entrance aperture extending along the longitudinal axis of the collector. An exit aperture is disposed opposite to, and is coextensive with, the entrance aperture, defining a beam path therebetween to allow a scanning beam to traverse the chamber. A detector, such as a photomultiplier tube, is in optical communication with the chamber and is disposed off the beam path to detect light reflecting from the coating. In other embodiments, the chamber of the hollow collector may be spherical or ellipsoidal in shape.

25 Claims, 4 Drawing Sheets

WAVELENGTH SELECTIVE LIGHT COLLECTOR SYSTEM

TECHNICAL FIELD

The present invention pertains to the field of light collectors. Specifically, the present invention pertains to a light collector ideally suited for storage phosphor imaging systems devices.

BACKGROUND ART

In typical storage phosphor imaging systems, a storage phosphor media is exposed to an image-wise pattern of short wavelength radiation to record a latent image. Typically, X-ray radiation is employed to record the latent image. The latent image is read by impinging, onto the media, radiation having a wavelength approximating the stimulation wavelength of phosphor. Upon stimulation, the storage phosphor emits radiation that typically has a wavelength different from the stimulation wavelength. Usually, the wavelength of the stimulating radiation does not overlap with the wavelength of the emitted radiation. For example, stimulating radiation typically has a relatively long wavelength such as red or infrared light. The emitted radiation, on the other hand, is usually of a shorter wavelength, such as blue or violet light. To produce a signal useful for electronic image processing, the storage phosphor is scanned in a raster pattern by a laser, causing the phosphor to emit radiation. The intensity of the emitted radiation is proportional to the quantity of short wavelength radiation used to record the latent image. The emitted radiation from the storage phosphor is collected and sensed by a photo-detector, such as a photomultiplier tube, to produce electronic image signals corresponding to the intensity of the emitted radiation sensed.

To optimize the signal-to-noise ratio, it is desirable to collect as much of the emitted light as possible and to direct it to the photo-detector. Many prior art light collection and detection systems have been provided. U.S. Pat. No. 5,369,481 to Berg et al. discloses a spectrometer including an integrating sphere having an interior surface coated with a highly reflective material. Light from an incandescent lamp is diffused within the sphere prior to reaching a sample. The coating is preferably spectrally flat, but may be color-correcting absorbing material to reduce red and green color elements in the light. A set of three detectors measure the total light reflected from the sample. The detector senses light reflected from various surfaces, dependent upon the spatial position of the detector in the sphere. The light sensed includes specularly reflected light, the source light diffusely reflected by the sphere, and the light reflected from the sample minus the specular component. Each detector includes a set of wavelength discriminating filters to pass only one selected wavelength for measurement at a time.

U.S. Pat. No. 5,274,228 to Kaplan discloses a light collector for a film scanner comprising an integrating light conducting cylindrical rod with a coating of diffusely reflective paint. The film is scanned with a laser light beam. Light entering a slit in the cylinder is directed to a photo-detector. The coating material is a high reflectivity spectrally broad white paint and the rod itself is transparent glass which is not colored.

U.S. Pat. No. 5,140,160 to Boutet et al. discloses a collector for storage phosphor imaging systems including a planar mirror and side-by-side pyramidal mirror which collect light and direct it to a photo-detector positioned at a centrally located aperture in the planar mirror. A drawback with the prior art collection/detection systems is that portions of stimulating radiation of a scanning beam may reflect from a sample surface and strike the surfaces of the collector, causing the reflected catoptric stimulated radiation to impinge upon the sample in an area other than where the scanning beam is focused, providing a false indication of signal strength.

What is needed is a collection/detection system that prevents catoptric stimulating radiation from impinging upon a phosphor storage sample being read by a scanning beam.

SUMMARY OF THE INVENTION

The above object has been achieved by providing a hollow light collector having an internal surface coated with a wavelength selective coating that absorbs light energy within a predefined range of wavelengths and reflects all other light energy. In the preferred embodiment, the internal surface forms a cylindrical chamber that includes an entrance aperture extending along the longitudinal axis of the collector. An exit aperture is disposed opposite to, and is coextensive with, the entrance aperture, defining a beam path therebetween to allow a light beam to traverse the chamber. A detector, such as a photomultiplier tube, is in optical communication with the internal surface and is disposed off the beam path to detect light reflecting from the coating. Alternatively, the collector may include only one aperture through which light will enter the collector. In other embodiments, the internal surface of the hollow collector may define chambers of varying geometries. The hollow collector may include a chamber having a spherical shape, or it may be elliptical in shape.

The collection/detection system can augment an existing storage phosphor imaging system. In such a system, a source of light, typically a laser, produces a beam and the collector is placed in the path of the beam. The beam passes through the collector via the entrance and exit apertures and is scanned across the longitudinal axis of the collector. The scanning beam impinges on a sample disposed proximate to the exit aperture. The scanning beam has a wavelength matching the stimulation wavelength of the sample, causing the sample to emit radiation at a wavelength differing from the stimulation wavelength. The emitted radiation enters the exit aperture and reflects from the coating on the internal surface, impinging upon the detector. The detector produces electronic image signals corresponding to the intensity of the emitted radiation sensed.

In the alternative embodiment having only one aperture, the scanning beam is impinged on a side of the sample opposite to the side facing the aperture. In this manner, the scanning beam is said to be transmitted through the storage phosphor, causing the sample to emit radiation.

BEST MODE FOR CARRYING OUT THE INVENTION

Figure 1:
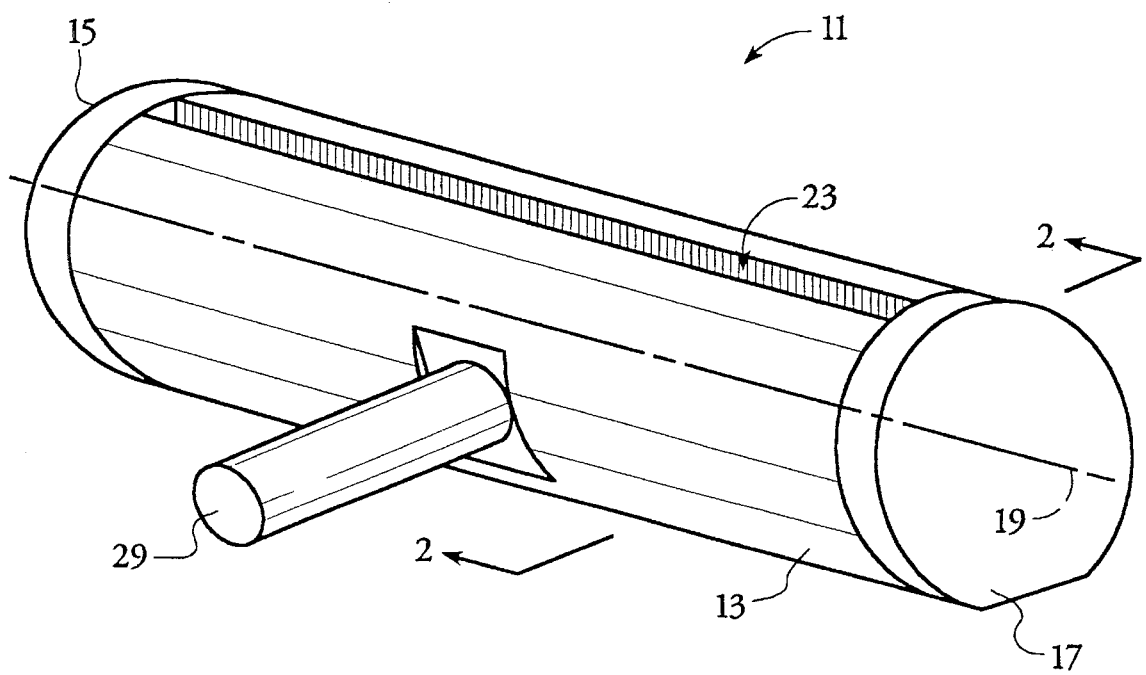
FIG. 1 is a perspective view of a collection/detection system, in accord with the present invention.
Figure 2:
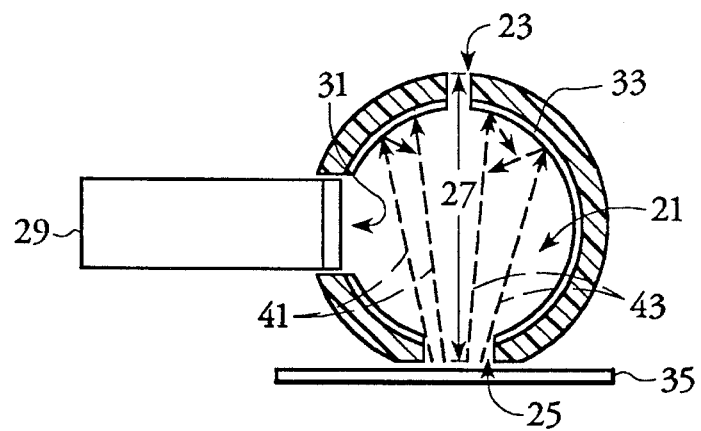
FIG. 2 is a cross-section view of the collection/detection system shown in FIG. 1, taken along lines 2—2.

FIGS. 1 and 2 show the preferred embodiment of a collection/detection system 11 including a hollow cylindrical body 13 extending between termini 15 and 17 along a longitudinal axis 19. The internal surface of the cylindrical body 13 and termini 15 and 17 define the internal space 21, or chamber, of the collection/detection system 11. An entrance aperture 23 extends between the termini 15 and 17, parallel to the longitudinal axis 19. Disposed opposite to, and extending coextensive with, the entrance aperture 23 is an exit aperture 25 defining a beam path 27 therebetween. A light detector 29 is in optical communication with the internal space 21 via port 31 which is centrally located on the body 13. A wavelength selective coating 33 is disposed over the entire surface of the internal space 21, attenuating light within a predefined wavelength range.

Figure 3:
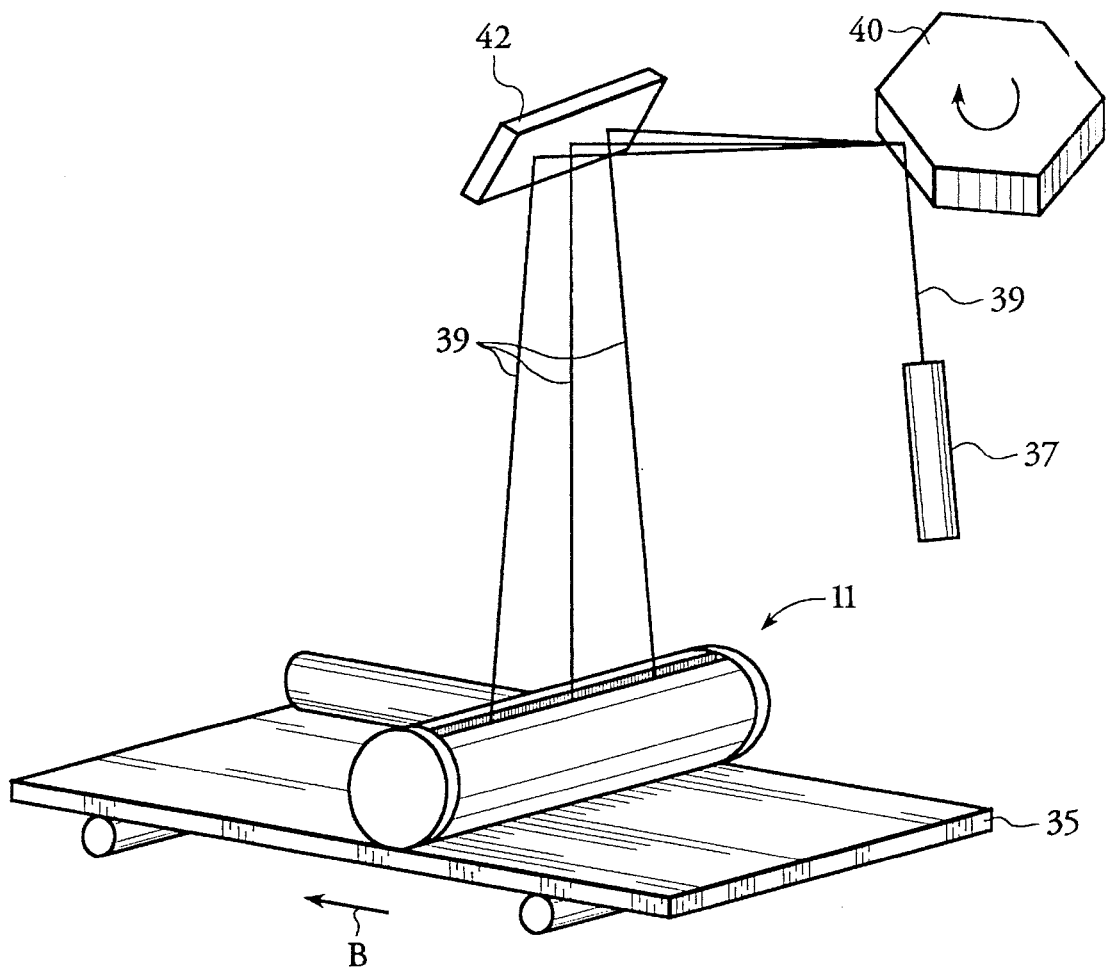
FIG. 3 is a perspective view showing a storage phosphor imaging system including the collection/detection system shown in FIGS. 1 and 2.

The collection/detection system 11 is to be used for reading latent images stored in a sample media 35, typically requiring a source of light 37 producing a beam 39, with the collection/detection system 11 placed in the path of the beam 39, as shown in FIG. 3. A scanning device, such as a polygonal scanner 40, is placed in the path of the beam 39. The beam 39 reflecting from the scanner 40 is deflected from a mirror 42 to traverse the beam path 27, passing from entrance 23 to exit 25 apertures, and scanning across the longitudinal axis 19 of the body 13. The scanning beam 39 impinges upon the media 35 which is positioned proximate to the exit aperture 25. The scanning beam 39 has a wavelength matching the stimulation wavelength of the sample 35, causing the sample 35 to emit radiation 41 at a wavelength differing from the stimulation wavelength of the scanning beam 39. The emitted radiation 41 enters the exit aperture 25 and reflects from the coating 33 so as to impinge upon the detector 29. The detector produces electronic image signals corresponding to the intensity of the emitted radiation sensed.

To facilitate collection of emitted radiation 41, the width of the exit aperture 25, measured transverse to the longitudinal axis 19, is typically greater than the width of the entrance aperture 23. Although the port 31 and the detector 29 are described as being positioned in the body 13, the detector 29 might also be placed in optical communication with the internal space 21 via a port positioned in one of the termini 15 or 17. It is essential to the proper operation of the system 11 that the detector 29 be disposed off of the beam path 27 so that it will not sense light from the scanning beam 39. Any type of detector may be employed, such as a CCD, with a photomultiplier tube being the preferred embodiment. A silicon detector may be employed, as well.

Referring also to FIG. 2, a problem encountered concerned reflection of a portion of the scanning beam 39, i.e., catoptric stimulation radiation 43, by the sample media 35. The catoptric radiation 43 reflecting from the sample media 35 was found to impinge upon the surface of the internal space 21 and re-image the sample media 35 at points not along the scanning path of the beam 39. This produces a false indication of signal strength along the scanning path, because any latent image stimulated by catoptric radiation 43 would result in emitted radiation 41 being sensed by the detector 29. To prevent catoptric radiation 43 from re-imaging the sample media 35, the coating 33 is disposed upon the entire surface forming the internal space 21 to absorb/attenuate light energy having a wavelength approximating the stimulation wavelength of the sample media 35.

Figure 4:
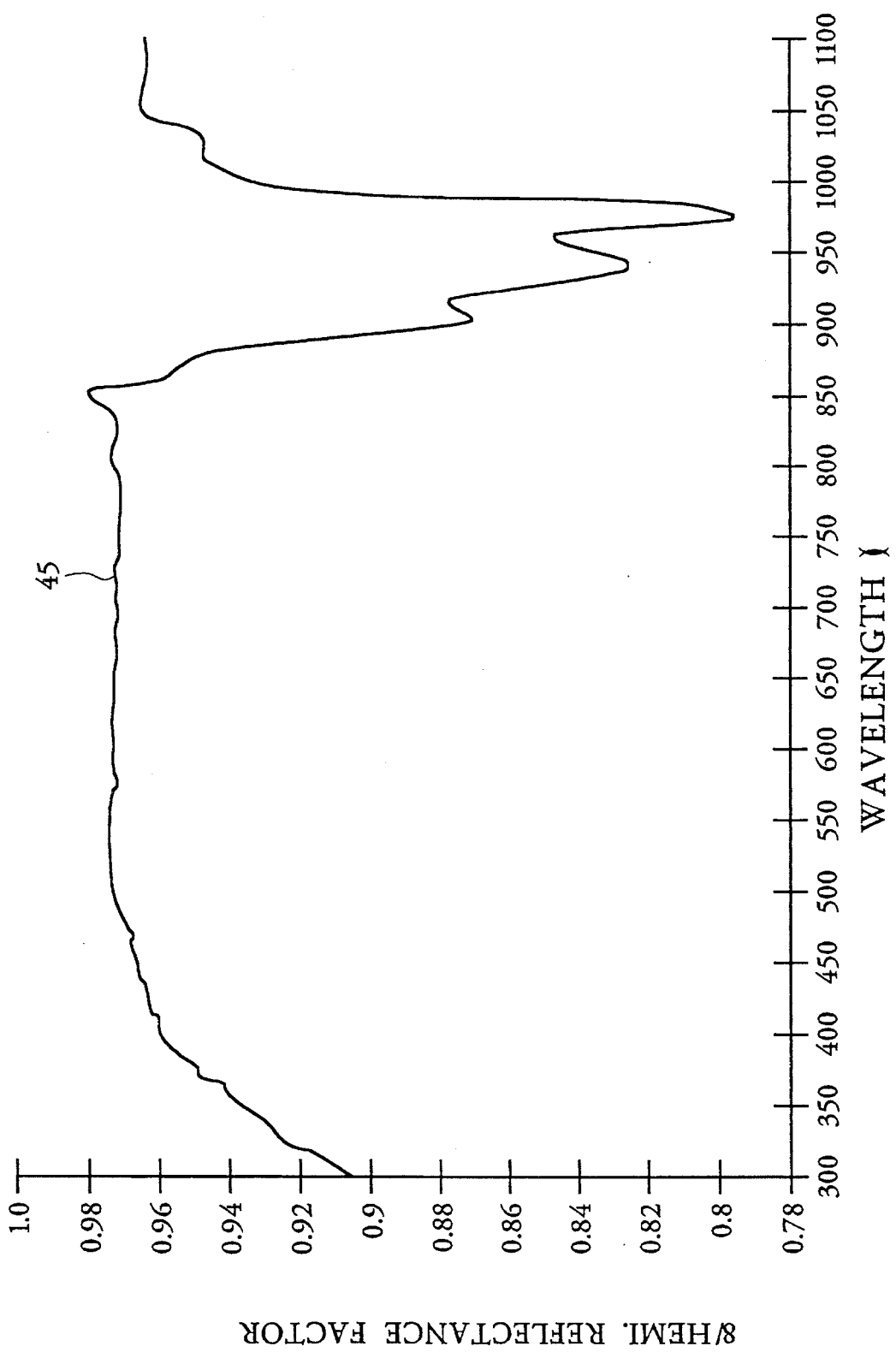
FIG. 4 is a graph demonstrating the reflectivity versus wavelength of the collection/detection system shown in FIGS. 1 and 2.

Referring also to FIG. 4, the sample media 35 is typically image storage phosphor that emits radiation in the range of 400–600 nm when stimulated with a beam having a wavelength in the range of 950 to 1050 nm. As such, the coating 33 is designed to provide minimum reflection of radiation in the wavelength range of 900 to 1050 nm, while providing substantially improved reflection for the wavelengths of radiation, as shown by curve 45. Coating 33 may be formed from a commercially available barium sulfate compound, sold under the name "white reflectance coating" by Eastman Kodak Co., Inc. as catalog number 1181759, that has been doped with either a rare-earth inorganic molecule, e.g. dysprosium oxide and ytterbium oxide, or an organic molecule. Coating 33 may also be formed from a barium sulfate compound manufactured by Labsphere, Inc. of North Button, N.H. under the trademark SPECTRAFLECT, which has been doped as previously described.

Referring again to FIGS. 2 and 3, in operation the media 35 includes phosphor storing a latent X-ray image. The media 35 is scanned in a raster pattern by coordinated movement of the scanning beam 39 across the width of the media 35, measured parallel to the body 13's longitudinal axis 19, and the movement of the media 35 perpendicular thereto, in the direction indicated by arrow B. The media may be in the form of a sheet, plate, belt or drum, dependent upon the application.

The storage phosphor media 35 emits radiation 41 in response to the scanning beam 39 impinging thereon. The emitted radiation 41 is in a range of wavelengths separate and distinct from the range of stimulation wavelengths of the scanning beam 39. The emitted radiation 31 enters the internal space 21 via the exit aperture 25. In addition to the emitted radiation 41, catoptric stimulation radiation 43 reflecting from the media, also enters the exit aperture 25. Both emitted radiation 41 and the catoptric radiation 43 impinge upon the coating 33. The coating absorbs/attenuates a great amount of the catoptric radiation 43 while reflecting the emitted radiation 41. In this fashion, only the emitted radiation 41 is sensed by the detector 29. The intensity of the emitted radiation 41 is proportional to the quantity of X-ray radiation used to record the latent image. The detector 29 produces electronic image signals corresponding to the intensity of the emitted radiation sensed.

Figure 7:
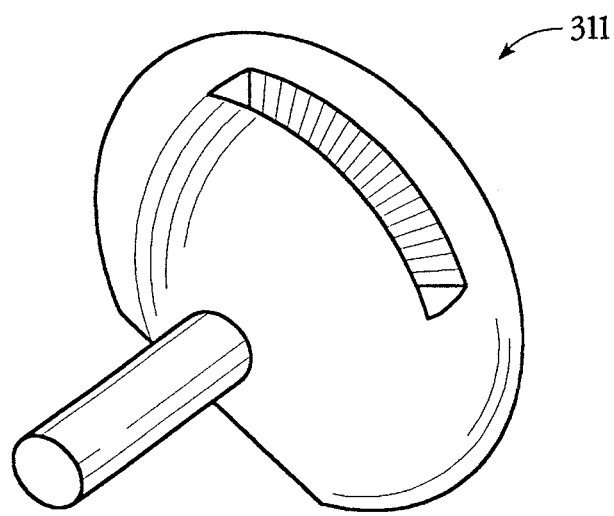
FIG. 7 is a perspective view of the collection/detection system in accord with a third alternate embodiment.
Figure 5:
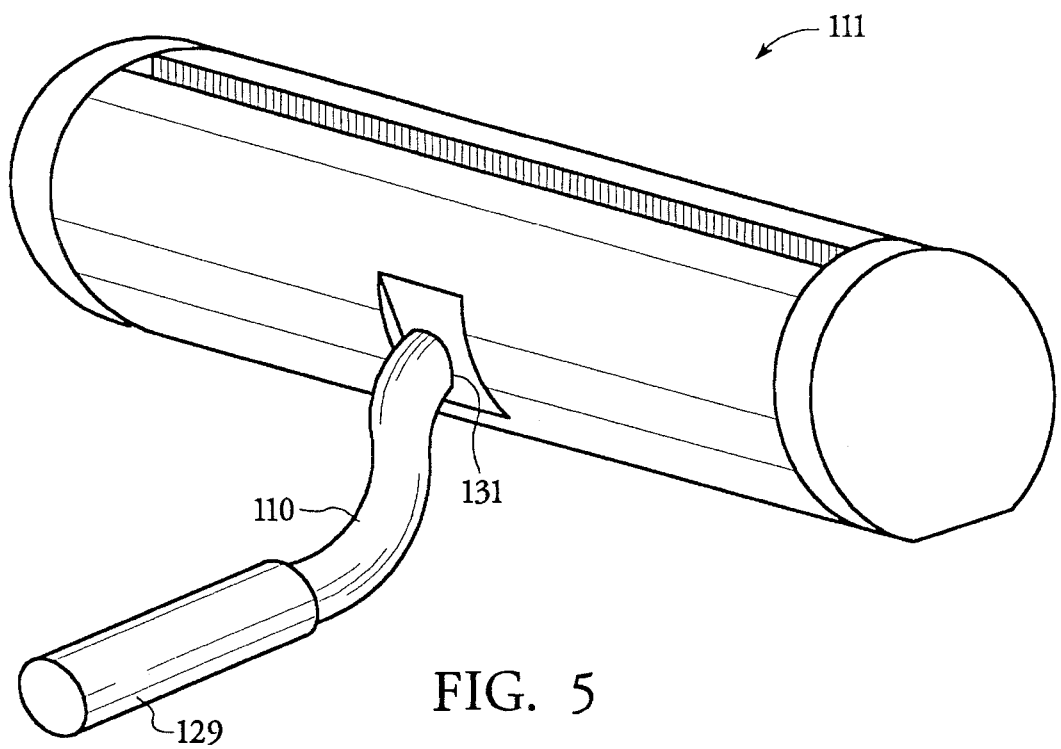
FIG. 5 is a perspective view of the collection/detection system in accord with a first alternate embodiment.
Figure 6:
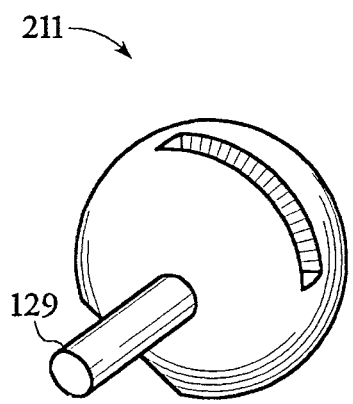
FIG. 6 is a perspective view of the collection/detection system in accord with a second alternate embodiment.

FIG. 5 shows an alternate embodiment of the collection detection system 111, in which the detector 129 is coupled to the internal space via fiber optical cables 110. In this manner, the detector 129 is said to be spaced apart from the port 131. Although the body 13 is described as having a cylindrical shape, it should be understood that the body 13 may define an internal space of any shape desired. To that end, the body 211 may have a spherical shape, shown in FIG. 6, or the body 311 may have an ellipsoidal shape, shown in FIG. 7.

Figure 8:
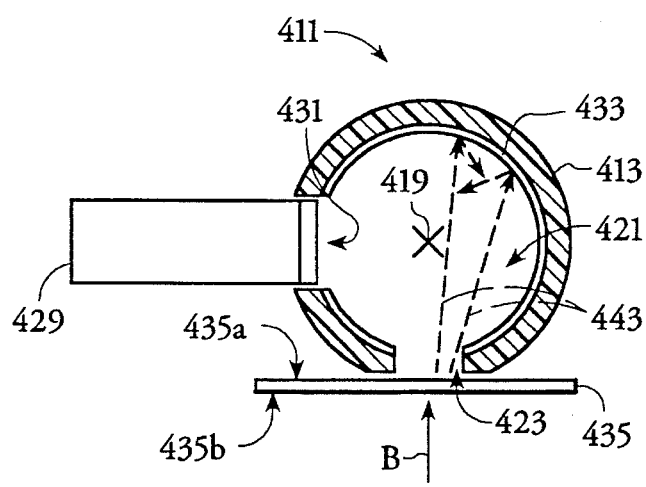
FIG. 8 is a cross-section view of the collection/detection system shown in FIGS. 1–2 in accord with an alternate embodiment.

FIG. 8 shows an alternate embodiment of the collection/detection system shown in FIG. 2 in which the entrance aperture is missing. Specifically, collection/detection system 411 includes a cylindrical body 413 extending along a longitudinal axis 419, with the internal surface of the cylindrical body 413 defining an internal space 421. An aperture 423 extends parallel to the longitudinal axis 419 and is positioned proximate to a surface 435a of a storage media 435. The light detector 429 is in optical communication with the internal space 421 via port 431, which is centrally located on the body 413. A wavelength selective coating 433 is disposed over the entire surface of the internal space 421, attenuating light within a predefined wavelength range, as discussed above. In this design, a beam of light, as indicated by arrow B, impinges upon a side 435b of the sample media 435 opposite to the side 435a which is proximate to the entrance aperture 423. In this manner, the beam is said to transmit through the sample media 435, causing radiation 441 to emit from the storage media 435. As discussed above, the radiation emitted 443 impinges upon the wavelength selective coating and is reflected therefrom to be detected by the detector 429. It should be understood that the body 413 may define an internal space of any shape desired, including the spherical shape and the ellipsoidal shape shown in FIGS. 6 and 7, respectively.

I claim:

1. A wavelength selective light collector, comprising:
   an elongated, axially symmetric, hollow chamber defined by an interior surface of a shell with an axially extending slit to admit light;
   a wavelength selective coating means, disposed on said interior surface of the shell, for selective attenuation of a first optical band of wavelengths and reflection of a second optical band of wavelengths; and
   a light detector in optical communication with an interior of said shell through a port in said chamber, with substantially all attenuation of said first optical band of wavelengths in the collector resulting from said first optical band of wavelengths impinging upon said interior of said shell.

2. The light collector a recited in claim 1 wherein said port is spaced from said axis.

3. The light collector as recited in claim 1 wherein said light detector is directly mounted to said port.

4. The light collector as recited in claim 1 wherein said light detector is spaced apart from said port by optical fibers.

5. The light collector as recited in claim 1 wherein said light detector is a CCD array.

6. The light collector as recited in claim 1 wherein said light detector is a photomultiplier tube.

7. The light collector as recited in claim 1 wherein said light detector is a silicon detector.

8. The light collector as recited in claim 1 wherein said shell is a cylinder.

9. The light collector as recited in claim 8 wherein said cylindrical shell has a circular cross section.

10. The system as recited in claim 1 wherein said shell has an elliptical cross section.

11. The light collector as recited in claim 1 wherein said wavelength selective coating comprises barium sulfate.

12. The light collector as recited in claim 8 wherein said slit in said cylindrical shell has a length greater than half the length of the cylindrical shell and is parallel to the axis of the shell.

13. The light collector as recited in claim 1 wherein said second optical band of wavelengths comprises 400–600 nm.

14. The light collector as recited in claim 1 wherein said first optical band of wavelengths comprises 950-1050 nm.

15. The light collector as recited in claim 1 wherein said second optical band of wavelengths is mutually exclusive of said first optical band.

16. A light collection and detection system for phosphor storage media, said system comprising:
    a hollow light collector with an internal space and an axially extending slit, disposed proximate to said media, to admit external light therein, an internal surface of said collector having a wavelength selective coating disposed thereon characterized by a low reflectivity in a first wavelength range and a high reflectivity in a distinct second wavelength range, with a portion of said internal surface disposed opposite to said slit; and
    a detector in optical communication with said internal space and disposed to detect light reflected from said coating.

17. The system as recited in claim 16 wherein said first wavelength range comprises 950–1050 nm and said second wavelength range comprises 400–600 nm.

18. The system as recited in claim 16 wherein said first wavelength range includes 632 nm and said second wavelength range comprises 400–600 nm.

19. The system as recited in claim 16 wherein said internal surface is spherical in shape.

20. The system as recited in claim 16 wherein said internal surface is cylindrical in shape.

21. The system as recited in claim 16 wherein said internal surface is elliptical in shape.

22. The system as recited in claim 16 wherein said wave selective coating comprises barium sulfate.

23. A light collection and detection system, comprising:
    a source of light to produce a beam within a first wavelength range and illuminate a spot of a sample surface, producing stimulated light within a second wavelength range and reflected light, with said first wavelength range being separate and distinct from said second wavelength range;
    a hollow light collector with an internal space, said light collector being disposed in a path of said beam and having an entrance aperture for admitting said beam into said internal space, and an exit aperture disposed opposite to said entrance aperture, to allow said beam to exit said internal space, an internal surface of said collector having a wavelength selective coating means, disposed thereon, for attenuation of light within said first wavelength range and reflection of light within said second wavelength range; and
    a detector in optical communication with said internal space and disposed to detect light reflected from said coating, with substantially all attenuation of said light within said first wavelength range resulting from impingement of the same upon said internal surface.

24. The system as recited in claim 23 wherein said first wavelength range comprises 625–1050 nm and said second wavelength range comprises 400–600 nm.

25. The system as recited in claim 23 wherein said light collector is cylindrical in shape.

* * * * *